Figure 1:
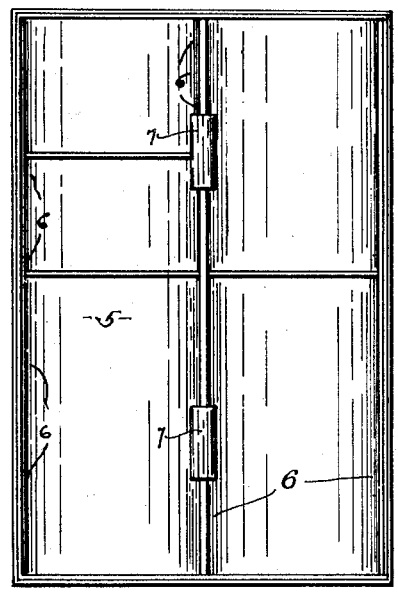

Oct. 18, 1927.

C. C. HOFFMAN 1,646,147

DINNER PAIL CONTAINER

Filed Feb. 27, 1923

INVENTOR.
Carl C. Hoffman
BY
ATTORNEYS.

Patented Oct. 18, 1927.

1,646,147

UNITED STATES PATENT OFFICE.

CARL C. HOFFMAN, OF EMPORIA, KANSAS.

DINNER-PAIL CONTAINER.

Application filed February 27, 1923. Serial No. 621,549.

My invention relates to containers to be placed within a dinner pail.

The various objects of my invention are as follows:

First, to provide a tray being in one unit and stationed on bearing lugs, a distance above the bottom of the pail proper.

Second, to place within said tray, additional trays having a plurality of compartments.

Third, that the one unit tray may be left out and the compartment trays placed in the pail and rest on the same lug bearings.

Fourth, to provide simple means for lifting said compartment trays from the pail, without the fingers contacting with the food.

Fifth, to provide a tray with a plurality of compartments, and each tray having rounded sides or ends for convenience of cleaning said compartments, and two of said compartments having tight fitting lids to prevent dissolving the substance contained, such as salt or sugar, by the moisture from the food substance.

Sixth, to provide a dinner pail in which coffee is carried, and when placed on the stove for heating, the steam or heat therefrom, may circulate around each compartment of the tray.

These and other objects will be more fully hereinafter explained.

Referring to the drawings—

Figure 2:
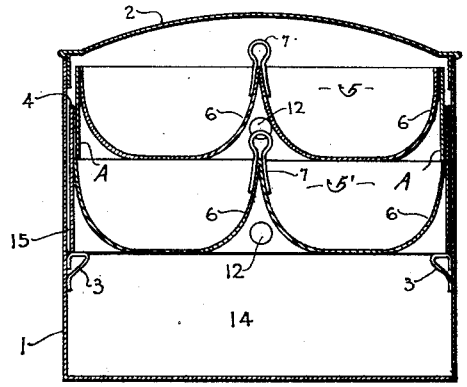
Figure 3:
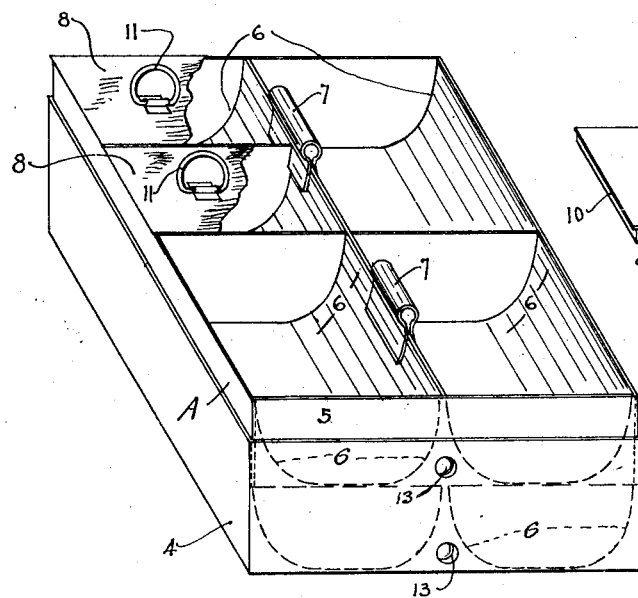
Figure 4:
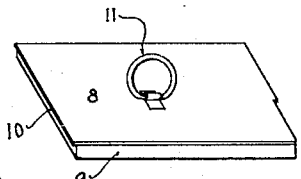

Fig. 1 is a top view of the pail with lid removed. Fig. 2 is a cross section through said pail and containers. Fig. 3 is a perspective view of the containers assembled. Fig. 4 is a detail view of a compartment lid.

1 is the dinner pail, 2 is the lid of said dinner pail, 3, 3 are the lugs attached to side walls of said pail to support the containers a certain distance above the bottom of said pail, 4 is a tray, as one unit, the side walls of which extend upward paralleling the side walls of the pail, and in which may be placed a plurality of containers 5, 5', said containers having curved side walls as shown at 6. The container 5 has downwardly extending flanges A for the sides thereof, said flanges being integral with said container, and adapted to rest on the upper edges of the container 5'. 7, 7 are clips attached to partition walls for convenience of lifting the trays without contacting with the food within said trays. 8, 8 are the lids covering two of the compartments and these compartments may be used for sugar or salt which may dissolve under the accumulation of moisture, but the introduction of moisture is retarded by the tight fitting lids which have a flange 9 fitting within the walls of said compartments, and the rim 10 is adapted to extend over the side walls of said compartments. 11, 11 are rings centrally attached for convenience of removing said lids, and being hinged thereto, said rings can be laid flat for convenience of economizing space when the tray is placed thereon. 12, 12 are vents placed in the end walls of the containers 5, 5 between the curved side walls of adjacent compartments, for convenience of circulation of the air, to maintain an even temperature around said compartments. Apertures 13, 13 are placed in the walls of tray 4, so positioned that they will register with the vents 12, 12, and the heat that will rise from the area 14, will pass through between the walls of the bucket and the container 4, through the crevices 15 by which means the heat from coffee or tea that may be contained therein will circulate around the side walls of the containers and the said containers are likewise loosely fitted, for the circulation above described.

I am aware that dinner pails and cooking devices are made, having trays subdivided, but do not claim such broadly, and such modifications as to division of compartments and general shape, may be employed as lies within the scope of the appended claim.

Having thus described my invention, what I claim as new and desire to secure by Letters Patent is:

In a dinner pail container, the combination of a container comprising two parallel compartments having curved sides, the ends of the compartments being closed by rectangular members, each of said members having a perforation in registry with the space between the adjacent curved sides, a perforated tray to receive a plurality of said containers, the perforations of said tray being through the end walls thereof and in registry with the first said perforations, clips engaging with the adjacent curved walls of the container so that the upward extension thereof will engage between the curved walls of a similar container placed thereon, the said clips functioning as handles for the container, all as, and for the purpose described.

CARL C. HOFFMAN.